(12) United States Patent
Chayanam et al.

(10) Patent No.: US 12,229,765 B2
(45) Date of Patent: Feb. 18, 2025

(54) DE-CENTRALIZED AUTHENTICATION IN A NETWORK SYSTEM

(71) Applicant: Bank of America Corporation, Charlotte, NC (US)

(72) Inventors: Pavan Chayanam, Alamo, CA (US); Navdeep Mahajan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 346 days.

(21) Appl. No.: 17/750,614

(22) Filed: May 23, 2022

(65) Prior Publication Data

US 2023/0376947 A1 Nov. 23, 2023

(51) Int. Cl.
*H04L 9/40* (2022.01)
*G06Q 20/38* (2012.01)

(52) U.S. Cl.
CPC ........... *G06Q 20/389* (2013.01); *H04L 63/08* (2013.01)

(58) Field of Classification Search
CPC .............................. H04L 63/08; G06Q 20/389
USPC ............................................................ 726/2
See application file for complete search history.

(56) References Cited

U.S. PATENT DOCUMENTS

| | | | | |
|---|---|---|---|---|
| 8,195,819 | B1 * | 6/2012 | Delker | H04L 63/0892 709/229 |
| 9,288,060 | B1 | 3/2016 | Jonsson | |
| 10,360,366 | B1 * | 7/2019 | Dubey | H04L 41/0663 |
| 10,448,251 | B1 * | 10/2019 | Maria | H04W 12/06 |
| 10,492,071 | B1 * | 11/2019 | Havaralu Rama Chandra Adiga | H04W 12/082 |
| 2005/0216955 | A1 * | 9/2005 | Wilkins | H04L 63/1408 726/23 |
| 2008/0260156 | A1 * | 10/2008 | Baba | G06F 21/34 726/2 |
| 2017/0171189 | A1 * | 6/2017 | Byszio | H04L 63/083 |
| 2020/0186520 | A1 * | 6/2020 | Oberheide | G06Q 20/356 |
| 2021/0203666 | A1 * | 7/2021 | Woodland | H04L 63/108 |
| 2022/0021536 | A1 | 1/2022 | Sehrawat | |

FOREIGN PATENT DOCUMENTS

| | | |
|---|---|---|
| CA | 3035817 A1 | 9/2019 |
| EP | 3065370 A1 | 9/2016 |

* cited by examiner

*Primary Examiner* — Michael S McNally
(74) *Attorney, Agent, or Firm* — Banner & Witcoff, Ltd.

(57) ABSTRACT

User authentication and validation for performing transactions may be performed by a validation server of a service provider. For example, when a login request or purchase request is received, the request may be authenticated or validated before permitting the requested transaction. In some arrangements, the validation may be delegated to one or more devices or users external to the service provider. Multiple validation users may be consulted for each transaction request to determine a consensus validation decision. A consensus may be reached based on unanimous responses or based on a specified threshold level (e.g., more than 50% responding positively or negatively). The service provider may use this consensus determination to authorize or reject a transaction request.

20 Claims, 9 Drawing Sheets

REGISTRATION AND ENROLLMENT FOR SERVICE PROVIDER

Title: [310]

Name: [305] [315] Identification Number:

Address: [320]

Phone Number: [325] [330] Mobile Text Number:

Email Address: [335]

Create An Account [340]

Username: [345] username123  Password: [355] ******** [350]
Your password is not long enough [360]

Register as validation user? ☐ [370]

[365] SUBMIT    CLEAR

FIG. 3

DE-CENTRALIZED AUTHENTICATION IN A NETWORK SYSTEM

BACKGROUND

Aspects of the disclosure relate to electrical computers, systems, networks, and devices for authenticating users and/or devices using a de-centralized process executed by validation devices.

Many existing network services and systems require user or device authentication. For example, accessing entertainment content or banking services may require that a user authenticate their identity before allowing access or executing some transaction. That authentication is typically performed in a centralized fashion by invoking a single server or set of servers to perform the verification and authentication functions. Such authentication functions may be used in a variety of applications including online services, mobile applications, and function-specific devices such as automated teller machines (ATMs), self-checkout kiosks, vending machines, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects, a service provider system may enroll users for accessing its services. This enrollment may include obtaining user identification information, contact information, credentials and the like. In some arrangements, credentials may be generated for the users by the service provider system. Additionally, or alternatively, the service provider system may inquire whether the user wishes to also enroll as a validation user. A validation user assists in validating requests (e.g., login request, purchase request, download request, viewing request, etc.) submitted by another user.

According further aspects, during or after enrollment, the service provider system may also select validation users for the registered user. Validation users may be asked to authenticate a user's identity when a user requests a transaction. In some arrangements, more than one validation user may be assigned to each enrolled user, and those assignments may be static. In other instances, validation user assignments may be dynamic and may be periodically, or based on some event trigger, revised or revisited.

In some aspects, when a user requests a transaction, the service provider system may determine whether to validate the request itself or to delegate the validation to one or more external devices and users. For example, the service provider system may choose to delegate validation functions if a validation or authentication module of the service provider system is overloaded, offline, experiencing errors or delays, and/or otherwise unavailable. If so, the service provider system may send a validation request to validation user devices that includes the requesting user's authentication information. The service provider system may then aggregate responses from the validation user devices to determine whether the transaction request is to be approved.

According to some aspects, a transaction request may be stored as a block in a blockchain network. Accordingly, validation of the transaction request may include validating the new transaction block for addition to the blockchain.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 illustrates an example enrollment user interface through which a user may enroll or register with a service provider according to one or more aspects described herein;

DETAILED DESCRIPTION

Figure 1A:
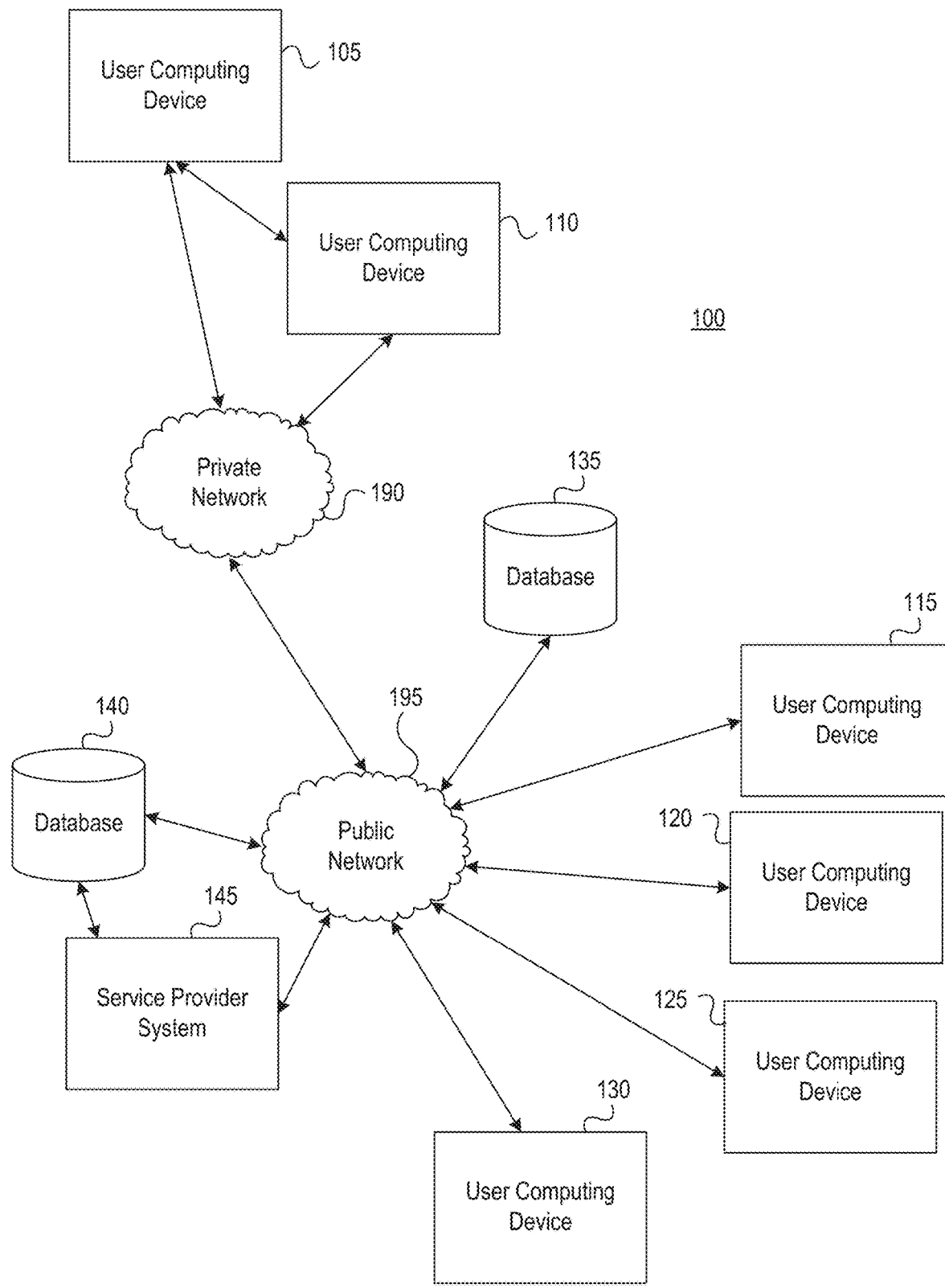
FIGS. 1A and 1B depict illustrative computing environments for implementing authentication and validation processing in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

User or device authentication is important in a variety of contexts, including for accessing online content, verifying identity, purchasing products, making other financial transactions and the like. Accordingly, authentication must be performed using trusted entities or systems to maintain the integrity of the process. In some instances, the authentication is performed by a trusted central device or system associated with the authenticating entity (e.g., a service provider, a financial institution, a government agency, etc.). However, when the central authentication system is unavailable for various reasons, aspects described herein allow for the delegation of the authentication process to a set of de-centralized devices. This de-centralized authentication process may involve one or more devices (e.g., user devices, other service provider devices, etc.) that each perform a validation process for an authentication request. Based on the results of each of these validation processes performed by the de-centralized authenticating devices, the authentication request may be approved or rejected.

In some examples, an authentication request may be represented as a new block in a Blockchain network to enhance security. Accordingly, an authentication system or device may perform Blockchain validation to confirm that the new block representing the authentication transaction should be added to the Blockchain network. Such arrangements may require that there is consensus between multiple authenticating devices before a new block is considered validated and added to the network.

Authenticating devices may be selected and assigned for each user or device registered or enrolled by a service provider. The selection may be static and therefore, the same set of authenticating devices may be used to validate a user or device each time that user or device seeks to access a service or make some other transaction. This static assignment allows for enhanced trust, given that the assigned authenticating devices have a history with the assignee user or device. In other arrangements, the assignment of validation users and/or devices may be dynamic and may be updated based on a schedule, periodically, using a triggering event, or the like and/or combinations thereof.

Additionally, the selection of the validation devices may be based on a variety of parameters and factors. For example, an authenticating entity may wish for validation devices to have a threshold level of geographic diversity. This diversity may help protect against tampering or malicious actors controlling all of the validation devices and subverting the validation process. Additionally, or alternatively, the validation devices may be selected based on the devices being available (e.g., powered on, having network connectivity, being in a non-sleep mode, etc.) during a threshold amount of time each day. Other factors and parameters may be used as desired and/or needed.

These and various other arrangements will be discussed more fully below.

Figure 1B:
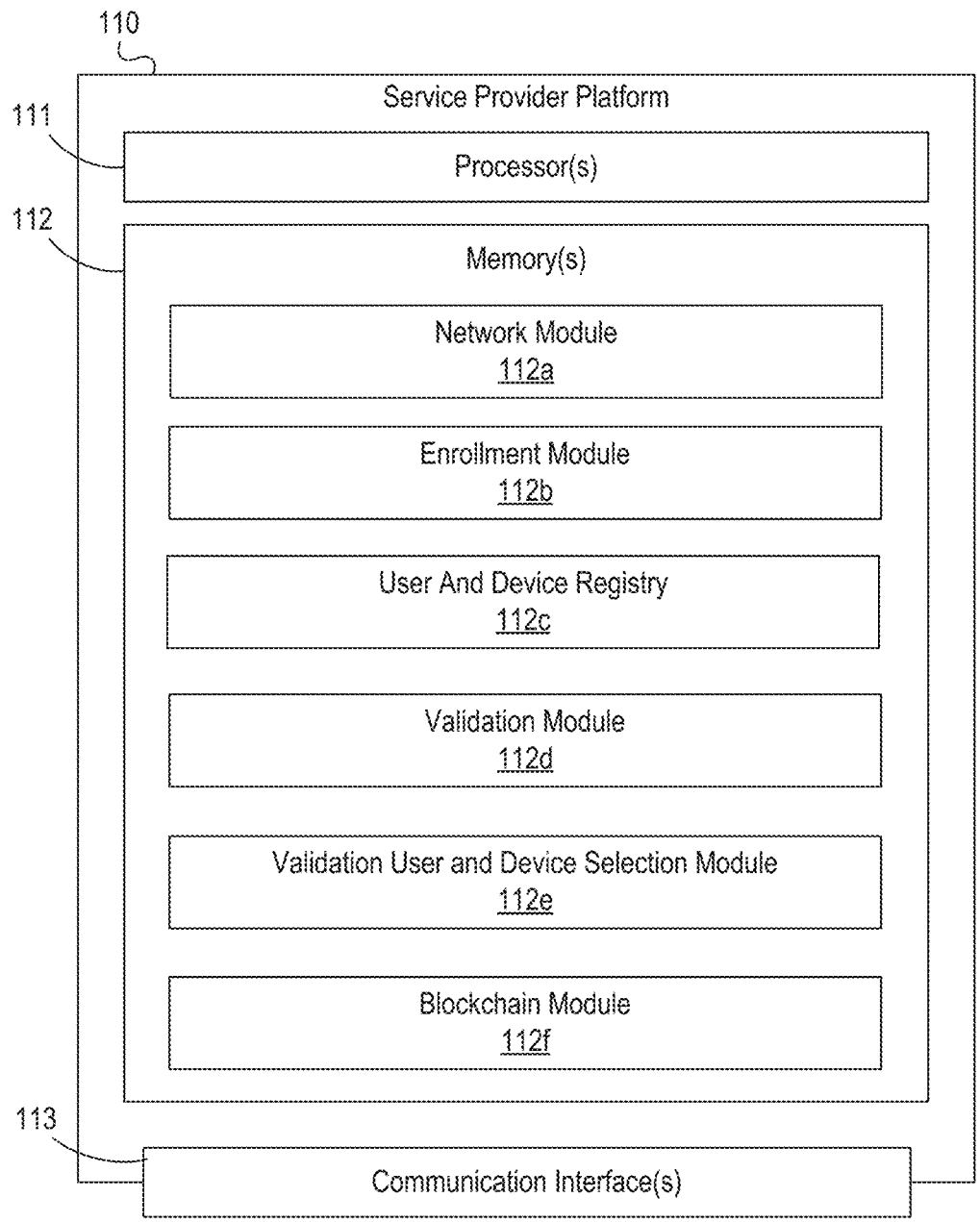

FIGS. 1A-1B depict illustrative computing environments for transaction processing, including enrollment and validation, functions in accordance with one or more aspects described herein. Referring to FIG. 1A, computing environment 100 may include one or more computing and electronic devices and/or other computing systems connected through one or more networks. For example, computing environment 100 may include user computing devices 105, 110, 115, 120, 125, and 130, databases 135 and 140, and a service provider system 145. Computing devices 105, 110, 115, 120, 125, and 130 may include laptops, mobile phones, smartphones, tablets, as well as electronic appliances and devices such as refrigerators, washing machines, dryers, lighting devices, stoves, ovens, microwaves, and the like, and other electronic devices such as vehicles. Such devices may also include processors and communication interfaces with which the devices may communicate with each other and/or other devices. While the illustration of FIG. 1A includes particular numbers of devices, any number of systems or devices may be used without departing from the aspects described herein.

As mentioned above, computing environment 100 also may include one or more networks, which may interconnect one or more of electronic devices 105, 110, 115, 120, 125, and 130, databases 135 and 140, and service provider system 145. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular user, location (e.g., home, office), and/or organization (e.g., a corporation, financial institution, educational institution, governmental institution, or the like) and may interconnect one or more computing devices associated with the user, location and/or organization. For example, private network 190 may be a user-configured home network that interconnects one or more of the devices at the user's home or otherwise associated with the user. This may include computing devices 105 and 110 as shown in FIG. 1A. In one or more examples, a device such as device 105 may connect to the private network 190 through another device such as computing device 110. Additionally, or alternatively, devices may connect directly to one another using various communication technologies and protocols including Bluetooth, NFC, infrared and the like. For example, device 105 may be connected to computing device 110 using Bluetooth. The private network 190 may further provide access to a public network such as the Internet or another wide-area network (WAN) and devices external to the private network 190, including service provider system 145, databases 135 and 140, and computing devices 115, 120, 125, 130.

Computing devices 115, 120, 125, and 130 may be located in a variety of locations and one or more of those computing devices 115, 120, 125, 130 may be co-located. Additionally, each of computing devices 115, 120, 125, 130 and/or the users thereof may be registered with the service provider system 145 as an authenticating or validation device and/or user. This allows for service provider system 145 to send requests to validation users through their devices 115, 120, 125, 130 to act as surrogate authenticating and validation users and devices if, for example, the service provider system 145 is unable to conduct the authentication itself. To register and perform the functions as an authenticating device, computing devices 115, 120, 125, 130 may be required to have a particular application installed therein, and meet certain communication, processing or other device specifications.

Device or user authentication may be used, and required, to access certain services provided by service provider system 145 and/or an entity associated with system 145. In one example, a user using computing device 105 may initially enroll with the service provider system 145 by providing user identifying information. This user identifying information may include contact information (e.g., geographic location, name, address, etc.), payment information, identification information (e.g., driver's license ID, other government-issued ID, organization ID, etc.), and the like. Additionally, or alternatively, the user may also create credentials such as a password or biometric key for accessing the user's account and services provided by service provider system 145. In some instances, the credentials may be created by the service provider 145 and may be used to generate one or more cryptographic keys such as a private/public cryptographic key pair. The private key may be provided to the user while the public key may be stored by the service provider system 145.

As part of the enrollment process, the service provider system 145 may further identify or select validation devices and/or users within the population of validation devices and/or users enrolled with service provider system 145. These validation user devices may be used to authenticate or otherwise validate a transaction (e.g., a login request, purchase, content access request) by the user of computing device 105 in various situations. For instance, if service provider system 145 has a high processing load or is experiencing a failure that prevents it from performing authentication or validation, those processes may be delegated to the selected validation devices 115, 120, 125, 130. Validation devices may be chosen based on various parameters including geographic location, active time periods, processing power, battery life, connectivity and the like. In some cases, service provider system 145 may prefer that at least two or at least three validation devices are selected from a user or user device 105, and that those three validation devices are all located in different geographic locations. In another example, the service provider system 145 may select validation devices based on the devices 115, 120, 125, and 130 all having active periods (e.g., periods in which the devices may receive communications and execute applications) of approximately the same timing (e.g., time of day, time of week). In yet another example, service provider system 145 may select validation devices 115, 120, 125, and 130 based on the devices having a particular application installed and having a processing power of a certain level. Various parameters and/or combinations of parameters may be used to select validation devices as discussed in further detail herein.

Once selected, the identities of the validation devices 115, 120, 125, and 130 may be stored in association with the enrolling user of computing device 105. Additionally, service provider system 145 may distribute one or more credentials of the user of computing device 105 to validation devices 115, 120, 125, and 130. These credentials may include identification information of the user and a key or code associated with the user. For example, the credentials may include a public key of a public/private cryptographic key pair. In some instances, only the public key may be sent to the validation devices and not the private key of the pair. Various information may also be sent to validation devices based on the requirements of the service provider system 145 and/or the service being provided.

According to some arrangements, users of devices such as devices 115, 120, 125, and 130 may opt-in for or opt-out of being selected for validation services. Additionally, upon being selected as a validation device, the corresponding user and device may receive instructions for downloading a particular application that may be used to perform the validation process. Once the application is installed, a confirmation may be sent to the service provider system 145, which may then add the corresponding user or device into a database of available validation users and devices. In some cases, opting-in to being a validation device may require a user to provide further user authentication or identification information beyond typical enrollment for services provided by the service provider system 145. For example, a user may be contacted through the telephone and/or email by the service provider to confirm the user's identity, required to submit additional identity documentation or other proof and evidence, and/or required to activate certain functions on the device such as location services, device metrics sharing, allow for silent notifications, and the like.

Once user of computing device 105 has been enrolled by service provider system 145 and validation devices for the user have been selected, the user of computing device 105 may then use services offered by service provider system 145. In one example, after enrolling, user computing device 105 may later send a login request to service provider system 145 to access one or more services. In response to the login request, the service provider system 145 may determine whether an authentication module or function associated with the service provider system 145 is available to validate the login request. This determination may be made based on processing load, network latency, whether the module is active or inactive (e.g., inactive or experiencing a failure) and the like. The determination may also be based on a user or system designation of whether the validation or authentication function should be performed by the service provider or by delegated devices.

If the service provider system 145 decides to delegate the validation functionality, service provider system 145 may transmit the login request to each of the selected validation devices 115, 120, 125, 130. In one example, this transmission of the login request may be in the form of a silent push notification. A silent push notification may be a message sent to a device that does not cause the device to play a sound, display any indicator, alert, or message, or provide any haptic notification. Since the validation process may be performed transparent to the user, such notifications are not necessary and may be undesirable. According to one or more arrangements, whether to be notified when the device is requested to assist in performing validation may be an option that a user may modify.

Each validation device 115, 120, 125, 130 may then determine whether the login is authorized by validating one or more credentials associated with the login request. In the example of cryptographic key pairs, the login request or data contained therein may be signed using the requesting user's private key. Accordingly, validation devices 115, 120, 125, 130 may use a corresponding public key of the requesting user to confirm that it is able to decrypt the request. The service provider system 145 may receive a response from each validation device 115, 120, 125, 130 and determine if all of the devices confirmed authentication. In some instances, all of the validation devices must confirm authentication for the service provider system 145 to approve the user's request or transaction. Unanimous confirmation may be required in cases where high levels of security are required. In other instances, some threshold percentage (less than 100%) may be required. For example, authorization may be given when greater than 50%, 60%, 75%, etc. of the validation devices confirm authentication.

If the service provider system 145 receives the requisite level of confirmation, the service provider system 145 may authorize the user for access to its services and/or approve a requested transaction. The user may be notified of the successful authorization through their device 105. In some arrangements, the login or other transaction requested by the user may be stored as a transaction in a blockchain network. This may require the block to be signed by the user using their cryptographic key and subsequently validated by nodes in the blockchain network before the block is added to the blockchain. For example, this blockchain validation may be performed by the selected validation devices 115, 120, 125, 130. Alternatively, the blockchain validation may be performed by nodes in the blockchain network and used as a further validation check for the transaction request.

Referring to FIG. 1B, service provider platform 110 may include one or more processors 111, memory 112, and communication interface 113. A data bus may interconnect processor(s) 111, memory 112, and communication interface 113. Communication interface 113 may be a network interface configured to support communication between service provider platform 110 and one or more networks (e.g., private network 190, public network 195, or the like). Memory 112 may include one or more program modules having instructions that when executed by processor(s) 111 cause service provider platform 110 to perform one or more functions described herein and/or one or more databases that may store and/or otherwise maintain information which may be used by such program modules and/or processor(s) 111.

In some instances, the one or more program modules and/or databases may be stored by and/or maintained in different memory units of service provider platform 110 and/or by different computing devices that may form and/or otherwise make up service provider platform 110.

For example, memory 112 may have, store and/or include network module 112a. Network module 112a may store instructions and/or data that may cause or enable service provider platform 110 to manage a network of devices (e.g., an IoT network, a service-provider local area or private network of devices, a validation device network, etc.) including monitoring membership, authorizing devices to join the network, facilitating communications between devices, enforcing device requirements such as processing capabilities, storage capabilities, required applications, required functionality, etc., specifying configuration and protocol parameters such as security and encryption and the like. For example, network module 112a may store rules for forwarding or filtering communications between devices, for setting permissions on device actions, for controlling reporting by the devices in the network and the like.

Service provider platform 110 may further have, store and/or include enrollment module 112b. Enrollment module 112b may store instructions and/or data that may cause or enable service provider platform 110 to obtain information about devices wishing to access services provided by the service provider through platform 110. Enrollment module 112b may be configured to receive requests from devices and users to subscribe or otherwise register with the service provider and to request information from the users and their associated devices. This information may include user identification information, contact information, device identification information, device capability information (e.g., hardware, software, etc.) and the like. Enrollment module 112b may also instruct users to create credentials for accessing the service provider platform 110. These credentials may include passwords, passcodes, biometric information (e.g., fingerprints, facial recognition, voice authentication, etc.), and the like. In one or more arrangements, enrollment module 112b may also issue multi-factor authentication challenges, such as sending an e-mail or text code confirmation for initial registration or enrollment. Additionally, enrollment module 112b may be configured to generate cryptographic keys (e.g., public/private key pairs) for the enrolling users and devices.

User and device registry 112c may be configured to store user information and device information for an associated device. A user registry portion of user and device registry 112c may store information for all enrolled users including identification information, contact information, access credentials (e.g., passwords, passcodes, cryptographic keys, two-factor authentication enrollment and information etc.). Additionally, registry 112c may include a device registry portion that identifies devices authorized to access services provided by the provider platform 110. For example, a device registry portion of registry 112c may store information such as a device identifier (e.g., device name, a username for a user associated with the device, etc.), a network identifier (e.g., IP address, MAC address, etc.), device model, device configuration and capabilities, and the like. In some arrangements, devices stored in a device registry portion of registry 112c may be associated with a corresponding user in the user registry portion. These user-device associations may allow the service provider platform 110 to identify authorized devices for each enrolled user so that users may only access service provider platform 110 using their authorized devices. In other instances, the devices identified in registry 112c may be authorized for various functions, while devices not identified in registry 112c may be used by users for a more limited set of functions.

Service provider platform 110 may further have, store and/or include validation module 112d. Validation module 112d may store instructions and/or data that may cause or enable service provider platform 110 to validate a user's transaction. For example, the validation module 112d may be configured to confirm that a user's login request is valid. Such validation may include authenticating the credentials submitted by the user as part of the login request. In one or more arrangements, the login request may be represented by a block in a blockchain network, where the block is digitally signed by a private key unique to the user. The validation module 112d may use a known public key corresponding to the private key to decrypt the block. If successful, the validation module 112d may confirm that the login request is authentic and valid, and thereby allow the user to access the services provided by platform 110. Validation module 112d may further cause service provider platform 110 to provide a notification to the user that the user was successfully authenticated.

In some arrangements, validation module 112d may coordinate validation processes among a network of devices, such as validation devices 115, 120, 125, 130 (FIG. 1A). In such instances, validation module 112d may delegate at least a portion of the validation process to other devices, including devices associated with other enrolled users. As discussed, this delegation may be used when validation module 112d has an excessive processing load, is undergoing maintenance or is otherwise unavailable for authentication functionality, and/or based on service provider preferences. Accordingly, validation module 112d may coordinate with other validation devices to determine whether the user's transaction request is authorized or otherwise authenticated.

To support validation by other devices, service provider platform 110 may further have, store and/or include validation user and device selection module 112e. Validation device selection module 112e may store instructions and/or data that may cause or enable service provider platform 110 to select a set of external validation users and their devices (i.e., outside of the service provider) for authenticating or otherwise validating user transaction requests. The validation user and device selection module 112e may store parameters and rules for validation device selection and may apply those selection parameters to select a set of validation users and devices for each enrolled user. The selected validation devices may be specific to the enrolled user and may be static. That is, the same selected set of validation user devices might always be used for the corresponding user when validation is delegated outside of the service provider. In other arrangements, the validation user and device selection module 112e may be configured to perform the validation device selection each time a user submits a transaction request (e.g., a login request). In yet other arrangements, the validation user and device selection module 112e may perform the selection process according to a specified schedule or at a given interval (e.g., every month, every two weeks, every six months, etc.).

Once selected, the validation users and devices may be stored in association with the corresponding user in a database. For example, validation user and device selection module 112e may store mappings between a selected set of validation users and devices and the enrolling user. Validation module 112d may consult validation user and device selection module 112e and/or the validation user and device database when performing validation of a transaction request so that it is able to request authentication/validation processes from the appropriate set of users/devices.

Further, according to some arrangements, service provider platform 110 may have, store and/or include blockchain module 112f. Blockchain module 112f may be configured to interface with a blockchain for verifying transactions performed through the service provider. In one example, blockchain module 112f may be responsible for adding a new transaction block to the blockchain every timer a user performs a transaction (e.g., logging in, requesting a service, etc.). As part of adding a new transaction block to the blockchain, blockchain module 112f may monitor to confirm that the new block is validated by nodes in the blockchain network. This blockchain validation may be a further step in the user authentication/validation process.

Figure 2:
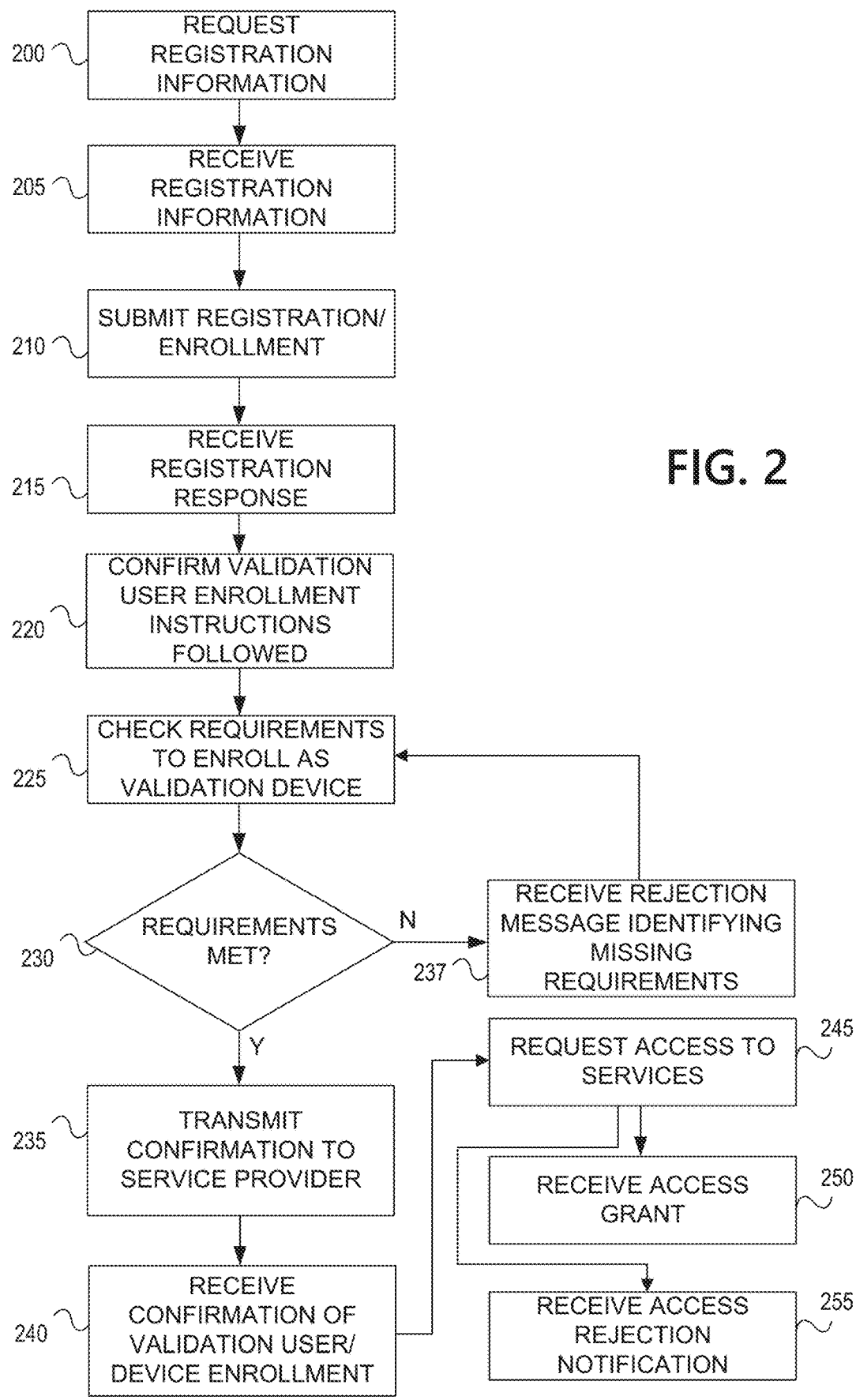
FIG. 2 is a flowchart illustrating an example enrollment process according to one or more aspects described herein.

FIG. 2 is a flowchart illustrating a process for enrolling in a service provider system. Enrollment may include registering a user and/or device to a service. A service provider may store user or device information to maintain a database of users that are authorized to access services provided thereby. In step 200, a user may request information for registering with a service provider. The request may take many forms, including a registration website request, request for a registration interface through a mobile application, a text message or an email requesting registration or enrollment, and the like and/or combinations thereof. In one example, the user may navigate to a registration website of the service provider through a browser application on the user's device. In another example, the user may send a text message (e.g., a particular word or phrase) to a specified number associated with the service provider, which is configured to trigger a registration text message from the service provider. A variety of different registration methods may be used or implemented.

In step 205, and in response to the request for registration information, the user's device may receive registration information such as a registration interface, a registration email, a registration text message and the like. The interface may include multiple questions and/or prompts and corresponding input fields in which the user is to respond to the specified questions and/or prompts. The registration or enrollment interface may request user identification information such as a name, as well as contact information including an address, telephone number, email address, text message number, and the like. The registration or enrollment interface may also ask the user to create user-specific credentials such as a password or passcode. Additionally, or alternatively, the service provider may allow the user to use biometric credentials such as a fingerprint or facial recognition or voice recognition. In some arrangements, the user may be permitted to use multiple or a combination of credentials for registration and enrollment. The registration information or interface may further ask the user to specify the services or products they would like to access. According to an aspect, the user may be asked whether they wish to act as a validation user to assist with validating other users and/or transactions. The user's response may be included as part of the registration process. A variety of other registration questions and prompts may be provided depending on the type of service and needs and desires of the service provider.

In step 210, the user device may submit the registration and enrollment information to a service provider upon detecting a corresponding instruction from the user. For example, when a user is finished filling in the registration information, the user may select a "Finish" or "Complete" or "Submit" option to instruct the device to transmit the registration information. In other cases, the instruction may be a command for transmitting a text message or sending an email (e.g., a "Send" button). In one or more arrangements, the user device may further generate a cryptographic key pair that includes a public key and a private key. Data may be encrypted using the private key and decrypted using the public key. This cryptographic key pair may be generated based on the passcode or other credential provided by the user. In other examples, the cryptographic key pair may be generated randomly. In any event, at least the public key of the cryptographic key pair may be sent along with the user's registration information in step 210. The cryptographic key pair may be used to authenticate the user and their transactions as discussed in further detail below.

In step 215, the user device may receive a response to their registration information (e.g., a registration request) confirming that the user has been successfully registered or enrolled. The response may provide various information including a user name, a welcome message, rules for accessing the services, and the like. According to some arrangements, if the service provider system is configured to generate the cryptographic key pair for the user (e.g., instead of the user device), the cryptographic key pair may be part of the registration confirmation/response provided in step 215. In one or more examples in which a user specifies that they would like to enroll as a validation user, the registration response may further include directions for configuring a validation function on the user's device. These directions may include downloading another application, activating certain features of the user's device, and the like. For example, the service provider may request that the user activate location services on the user's device, sharing performance metrics of the user device, enabling silent push notifications and the like. Additionally, or alternatively, enrolling as a validation user may require that the user submit additional information. For example, non-validation user's might not need to specify a geographic location while validation users might have to. Similarly, non-validation user's might not need to identify typical times during which the user's device is available, while validation users might be required to provide such information.

If the user has asked to enroll as a validation user, the user may be prompted, through the user's device, to confirm that they have followed the instructions for enrolling as a validation user in step 220. Upon detecting that the user has indicated confirmation (e.g., through selecting a button on the user's device), the user's device may be instructed or otherwise caused to check that the various device requirements are met in steps 225 and 230. These requirements may include confirming that required features have been activated or otherwise exist on the device. If the user device is determined to have met the requirements, the user device may transmit a confirmation to the service provider system in step 235. In one or more arrangements, the user device may send the status of the various features identified in the requirements to the service provider system for the service provider system to confirm and/or review for compliance.

In step 240, the user device may receive a confirmation that the user has been further enrolled as a validation device. If, on the other hand, the service provider system determines that one or more requirements have not been met, the user device may instead receive a rejection message or a message to try again in step 237. This message may include information identifying aspects of the user's device or user registration information that were found to be deficient or otherwise deemed to not meet the specified requirements.

Subsequent to the user's enrollment, the user may later attempt to access services provided by the service provider. For example, the user may attempt to login to their account through an application or website by entering user credentials in step 245. Because the user is already enrolled, the user device may receive a confirmation as to whether their credentials were accepted or not. For example, if the user credentials were accepted, the user may be allowed access to the service provider system through their device in step 250. Otherwise, the user device may receive a rejection message asking the user to try again in step 255 and/or inviting the user to enroll. The rejection message may specify an error such as a invalid username and/or incorrect password.

FIG. 3 illustrates an example enrollment user interface through which a user may enroll or register with a service provider. Interface 300 may include multiple fields configured to prompt the user for various types of information. One category of information may be identification information, including a name field 305, a title field 310, a user identification number or code field 315. Other identification information may be requested as needed or desired. Another category of enrollment information may be contact information such as a mailing or physical address 320, telephone number 325, mobile text number 330, and email address 335. Some or all of the fields 305, 310, 315, 325, 330 and 335 may be required while others might not be required. Additionally, or alternatively, a certain number of the fields might be required. For example, the service provider may require that name field 305 is completed while the others might be optional. For contact information, the service provider may require that the mailing or physical address field 320 is completed while requiring any one of telephone number 325, mobile text number 330, and email address 335.

In portion 340, the user may be asked to create access credentials including a username 345 and a password or passcode 350. The interface 300 may indicate (e.g., indicator 355) to the user if a username is taken or available after the user enters the username in field 345. Further, interface 300 may also indicate whether a password or passcode entered into field 350 is sufficiently complex or secure (e.g., based on length, types of characters, mixture of capitalization, use of symbols, and the like). For example, interface 300 may provide an error message 360 when the user's password or passcode is of an insufficient length. Other types of messages rejecting a password or passcode may be provided such as a message indicating that there are not enough numbers in the password or that the password does not include at least one symbol. A submit button or option 365 may be displayed in a selectable state when all requirements of the enrollment interface 300 have been met (e.g., all required fields entered and username and password are determined to be acceptable). Otherwise, the submit option 365 may be in an inactive state that does not allow the user to select it.

According to some arrangements, the user interface 300 may include an option 370 for enrolling as a validation user. Upon selecting this option, the user may be presented with additional prompts requesting more information relevant to performing the validation functions. Further, the validation user enrollment interface may include information for configuring the user's device for serving as a validation device. A variety of other options, prompts, and information may be included in interface 300 depending on the types of services being provided and the needs of the service provider. In some examples, services that provide sensitive information (e.g., financial, health, etc.) may ask for government-issued identification information.

Figure 4:
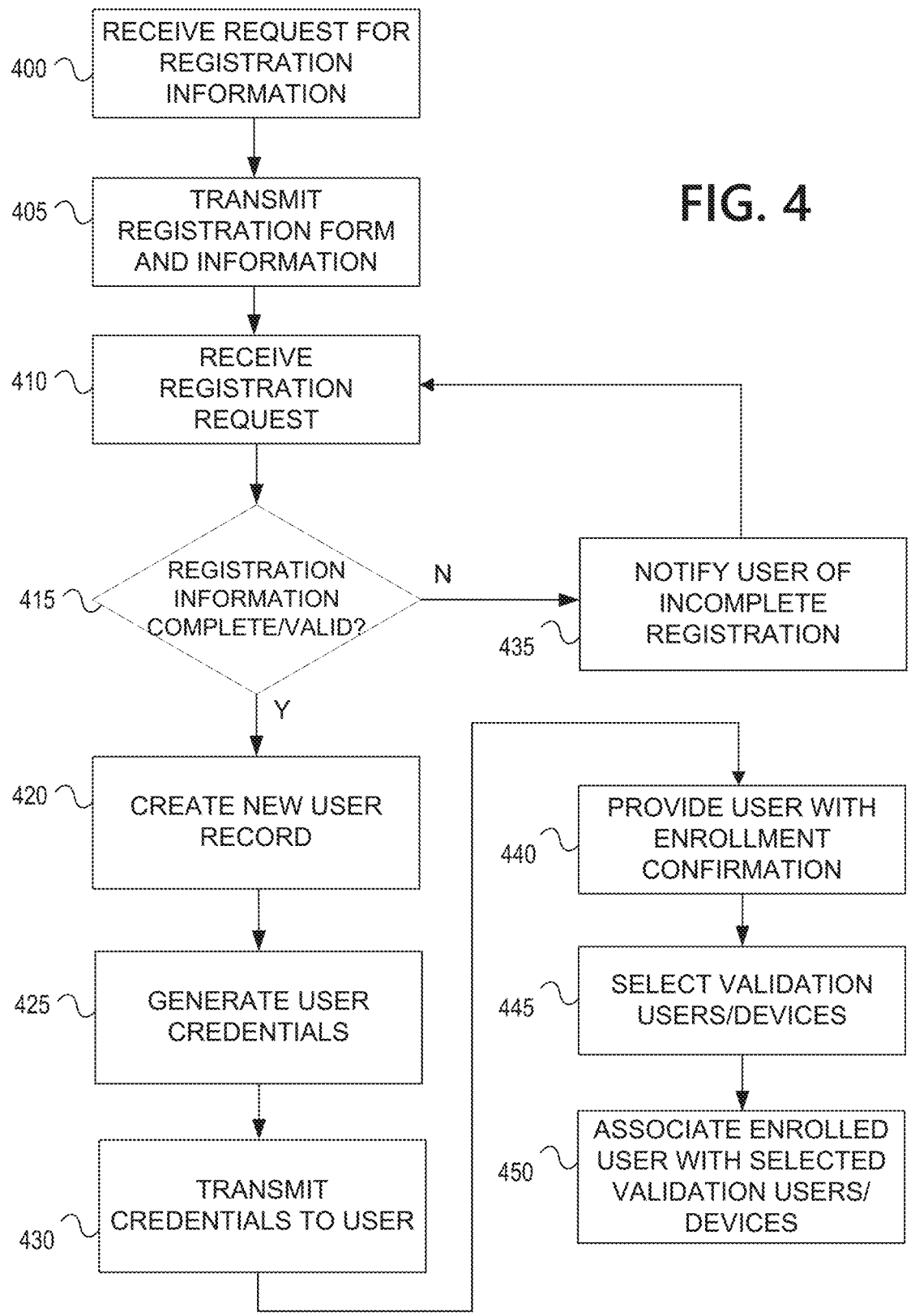
FIG. 4 is a flowchart illustrating an example process by which a service provider system may enroll or register a user for services according to one or more aspects described herein.

FIG. 4 is a flowchart illustrating an example process by which a service provider system may enroll a new user. In step 400, the service provider system may receive a request for registration information. This request may be received through a variety of channels and communication means including text, email, web, application (e.g., an application protocol interface (API) function call), and the like. In response, the service provider system may transmit a registration form and information to the requesting user and device in step 405. The service provider system may transmit the information using the same communication means or channel in which the request was received. In other arrangements, the service provider may use a different or multiple communication channels or means. For example, a user may request registration or enrollment information through a website. In response, the service provider system may send the user an email with a registration form link or identification of an application to download for facilitating the registration/enrollment. In another example, a user may request registration information by email and in response, the service provider may send a registration form or link to a registration form to the user through text message.

In step 410, the service provider system may receive a registration request from the user through the user's device. The registration request may include the information requested in the registration form or message provided in step 405. In step 415, the service provider system may determine whether the registration request includes all required information and if the information is valid. For example, this determination may include identifying information fields that were left blank and whether those fields are required fields. In another example, this determination may include verifying information such as an address (e.g., confirming that the address is valid using public databases), phone number (e.g., confirming format of phone number matches known phone numbers), email address, and the like. In the case of an email address and/or phone number, the service provider system may send a message to the email address or phone number requesting user confirmation that the number or email address is accurate. In yet another example, the determination may include confirming that the user credentials (e.g., a password or passcode) satisfies security requirements specified by the service provider system.

If the service provider system determines that the registration request is complete and valid, the service provider system may then create a new user record in a user database in step 420. Optionally, the service provider system may also be configured to generate encryption credentials for the user in step 425. For example, the service provider system may generate a cryptographic key pair (public/private key pair) with which the user may authenticate their transactions. If the service provider system performs this function, the service provider system may subsequently transmit the credentials, e.g., cryptographic information, to the user in step 430. In other cases, and as discussed previously, the user may create their own cryptographic key pair and transmit either just the public key or both the public and private key to the service provider system. The cryptographic key information may also be stored as part of the user record in the database in step 420.

If, on the other hand, the registration request is either incomplete or includes invalid information, in step 435, the service provider system may notify the user of such and ask that they correct the registration request. The process may then return to steps 410 and 415.

Once the registration request is completed and validated, the service provider system may transmit an enrollment confirmation to the user device in step 440. Additionally, the service provider system may select one or more validation users and/or devices for the newly registered user in step 445. These validation devices may be used when the service provider system is unable or otherwise cannot perform the validation functionality for authentication requests from the user. These validation devices may be devices of enrolled or registered users who have elected to serve as validating users. Accordingly, the service provider system may store a database of validating users, and select from that population of users. In one or more arrangements, when using external users for validation, the service provider system may require more than one validation user to authenticate a transaction from a user. Accordingly, when a user attempts to login to the service provider, the service provider system may require that at least 2, 3, 5, 10, or the like, confirm that the user's login request is valid. The use of more validation users may enhance the integrity of the authentication. In some instances, the service provider may select a number of validation users by balancing authentication integrity with efficiency. In some arrangements, the number of validation users required for a registered user may vary depending on a familiarity with or confidence in the identity of the registered user. For example, if the registered user has other accounts with the service provider and/or provides additional (optional) verifiable identification information, the service provider system may require and select fewer validation users.

Selecting the validation users may be based on a variety of parameters and criteria, including geographic location of the registered user and/or validation users, a time zone of the registered user and/or validation users, an active time of the user and/or validation users, and the like. For example, the service provider system may select validation users that have a diversity of geographic locations to protect against a bad actor attempting to circumvent the authentication process by modifying the devices of the validation users. With multiple devices having geographic diversity, it becomes less likely or more difficult for a bad actor to affect all of the validation devices in the same time window. The use of active time as a selection parameter provides the service provider system with a higher level of confidence that when an authentication request is received, the validation devices will be active and available to validate the request. Accordingly, not only might the service provider system select the validation devices based on the activity times of the registered user, it may also select validation devices having similar active periods as one another. Similarity in active periods between validation devices may be beneficial so that the authentication request may be validated by multiple, if not all, validation users selected for the registered user. Another selection consideration may be whether a candidate validation user is related or familiar with the registered user. If so, the service provider system might not select that candidate validation user in the interest of validation integrity and independence.

Once the validation users for the newly enrolled user are selected, in step 450, the service provider system may store an indication (e.g., a device or user ID) of the selected validation users in association with the newly enrolled user's record. In one or more arrangements, the service provider system may also notify the selected validation users of their selection and include some information about the newly enrolled user such as, for example, a public key of that user. The public key may be subsequently used when the newly enrolled user attempts to make a transaction (e.g., login, a purchase, etc.).

Figure 5:
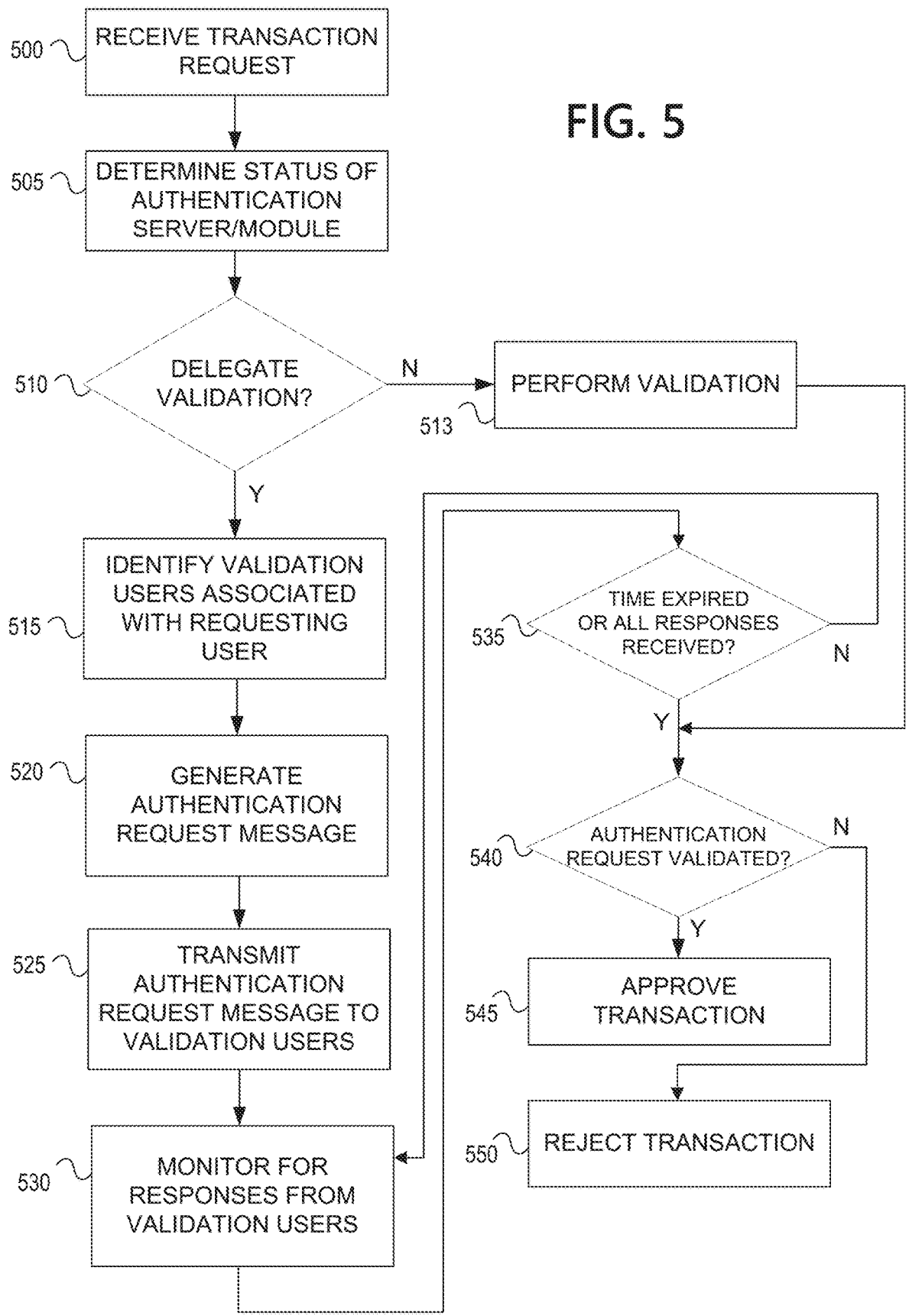
FIG. 5 is a flowchart illustrating an example authentication and validation process performed by a service provider system according to one or more aspects described herein.

FIG. 5 is a flowchart illustrating an example process by which a service provider system may process transaction requests. In step 500, the service provider system may receive a transaction request from a user through a user device. The transaction request may correspond to a variety of actions including a login attempt, a financial transaction (e.g., purchase or subscription), retrieval of data, accessing online entertainment, and the like and/or combinations thereof. The transaction request may include various pieces of information, including a user identifier (e.g., a username, email address, phone number, or user ID number) and a user credential such as a password, passcode, key, or the like. The transaction request may further include data or a location identifier of data that is encrypted using a user-specific key. For example, the transaction request may include a blockchain address for a block corresponding to the requested transaction. The block may be digitally signed or encrypted using the user-specific key. This key may be a private key of a public/private key pair. In another example, the encrypted data may be data provided by the service provider system as a challenge and subsequently encrypted by the requesting user device for validation.

In step 505, the service provider system may determine a status of an authentication server or module associated with the service provider. Determining the status may include sending a status request message to the authentication server or module and receiving a response indicating an active/inactive state of the server or module, a processing load, a network latency between the service provider system and the authentication server or module, storage capacity and/or availability, expected downtimes, and the like and/or combinations thereof. Based on the status information, the service provider system may determine in step 510 whether authentication for the transaction request should be delegated to external validation users. Various rules may be created for making this determination. For example, the service provider system might delegate authentication functions whenever the authentication server or module is inactive. In another example, the service provider system might delegate authentication functions when the processing load of the authentication server or module is above a certain load threshold. Similarly, the storage capacity (above or below a certain threshold) may also be considered as part of the determination process. If authentication processing is to be performed by the service provider system, the validation process may be performed in step 513.

If, however, the service provider system determines that authentication processing is to be delegated, in step 515, the service provider system may then identify the validation users associated with the transaction requesting user. For example, the service provider system may retrieve a user record corresponding to the requesting user and obtain information for a set of one or more validation users stored in association with that user record. Once the validation users have been identified, in step 520, the service provider system may then generate an authentication request message to be sent to each of the validation users. The authentication request message may include the transaction request user's username or other identifier as well as the data or location identifier of the data that is encrypted using the user's credential (e.g., private key). The service provider system may then transmit the authentication request message to each of the validation users in step 525. In one arrangement, the transmission may be in the form of a silent push notification. The silent push notification may be configured to trigger an application on each validation user's device to execute an application or set of instructions to validate authentication request. The silent push notification may also be configured to not trigger any user-perceptible notifications (e.g., no audio, visual, or haptic notification or alert) on the validation user's device so that the message is received and subsequent authentication processing is performed transparently to the user.

In step 530, the service provider system may monitor for authentication responses from each of the validation users. In some examples, the service provider system may set an expiration time and determine whether a time limit has expired in step 535. Additionally, or alternatively, the service provider system may determine whether all responses have been received (step 535). Once the service provider system determines that the time limit has expired or that all responses have been received (step 535:Y), the service provider system may determine whether the authentication responses from the validation users meet a threshold validation requirement in step 540. For example, the service provider system may require that all validation users responded with a positive confirmation or validation of the authentication request. A positive confirmation or validation may represent that the validation user's device successfully decrypted data associated with the authentication request using the requesting user's credentials. In the case of a public/private key pair, a positive validation may include the validation user's device indicating that it was able to decrypt data associated with the authentication request using the public key of the requesting user, and that the decrypted data matched a known decrypted version of the data (e.g., control data). In some arrangements, the service provider system may require less than all validation users to respond with a positive confirmation or validation. For example, the service provider system might only require 75% positive validation or greater than 50% positive validation. Additionally, if a validation user does not respond within the time limit, the service provider system may treat the non-response as a negative validation. In other cases, the service provider system might only evaluate validation user that did respond. Accordingly, a percentage threshold for positive responses may be determined based on the number of responses received (i.e., not counting validation users that did not respond). For example, if 5 of 7 validation users responded, the service provider system may determine that the authentication request had a 100% confirmation or validation rate if all 5 of the responses were positive.

In step 545, if the authentication responses from the validation users meet the criteria as determined in step 540, the service provider system may approve the requested transaction. For example, the service provider system may allow the user access to their account and/or specific pages only accessible to registered users in response to a login request. In another example, the service provider system may process or approve a financial transaction requested by the user in response to a positive determination from step 540. In some arrangements, the service provider system may approve a requested transaction by transmitting a silent push notification to the request user's device. If, however, the validation criteria is not met, the service provider system may reject or deny the request in step 550. Various types of transactions may be requested and processed using the authentication process described in FIG. 5.

According to some aspects, the service provider system may ask validation users to provide perform validation in addition to the service provider system also performing validation. This may allow the service provider system to increase the reliability and security of authentication processing. Additionally, if the service provider system performs part of the validation, the criteria or criterion for a successful validation of the authentication request may change. For example, a lower confirmation or validation threshold for responses from external validation users may be required if the service provider system successfully validates an authentication request than if the service provider system either does not perform validation or has a negative validation determination.

Figure 6:
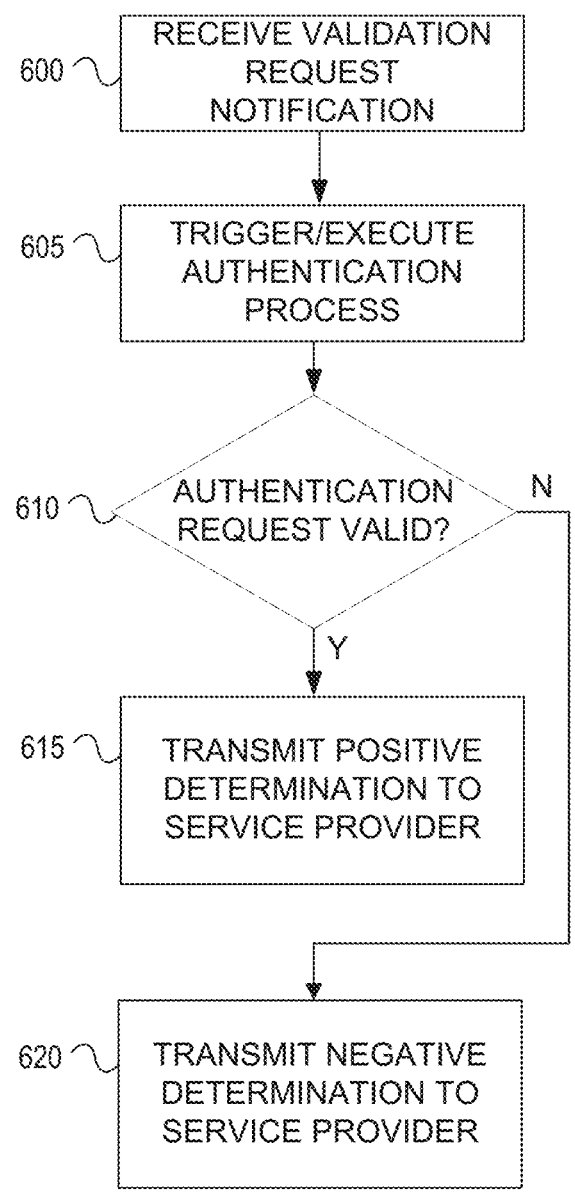
FIG. 6 is a flowchart illustrating an example validation process performed by a validation user according to one or more aspects described herein.

FIG. 6 is a flowchart illustrating an example process by which a device of a validation user may be configured to perform authentication validation for a service provider system. In step 600, the validation user device may receive a silent push notification from the service provider system. The silent push notification may be a particular messaging type transmitted over a network to the device that does not trigger a user notification or alert. Upon receiving the silent push notification, the validation user device may automatically trigger an authentication process in step 605. The triggering of the authentication process may include launching an application on the validation user device and/or causing a set of authentication process instructions to be executed by the device. For example, the silent push notification may include an instruction (e.g., an application identifier and/or an action command) configured to cause the validation device to execute a validation application and/or to execute instructions contained in the notification.

In step 610, the validation user device may determine whether the authentication request received from the requesting user is valid. In one example, the validation user device may perform such validation by attempting to decrypt a data block or other unit of data using a public key associated with the requesting user. As discussed previously, the requesting user's public key may have been shared with the validation user upon the requesting user's enrollment. Alternatively, the public key may be shared by the service provider system at some point after the enrollment. For example, the public key may be transmitted to the validation user device along with the transaction request. The validation user device may determine that the authentication request is valid when it is able to decrypt the data with the public key. Additionally, the validation user device may compare the decrypted data with a known valid decrypted version of the data to make sure the data matches. The known valid decrypted version of the data may be provided by the service provider system as part of the validation request (e.g., to validate the authentication request).

In step 615, if the validation user device determines that the authentication request is valid, the validation user device may transmit a positive confirmation message back to the service provider system. If, on the other hand, the validation user device determines that the authentication request is invalid (e.g., it is unable to decrypt the data with the public key), the validation user device may transmit a negative indication message back to the service provider system in step 620. In some examples, the validation user device's response may be encrypted as well to provide additional assurances as to the integrity of the validation process. For example, the response message may be encrypted by a private key of the validation user device, and decrypted by the service provider system upon receipt using a public key of the validation user device.

Figure 7:
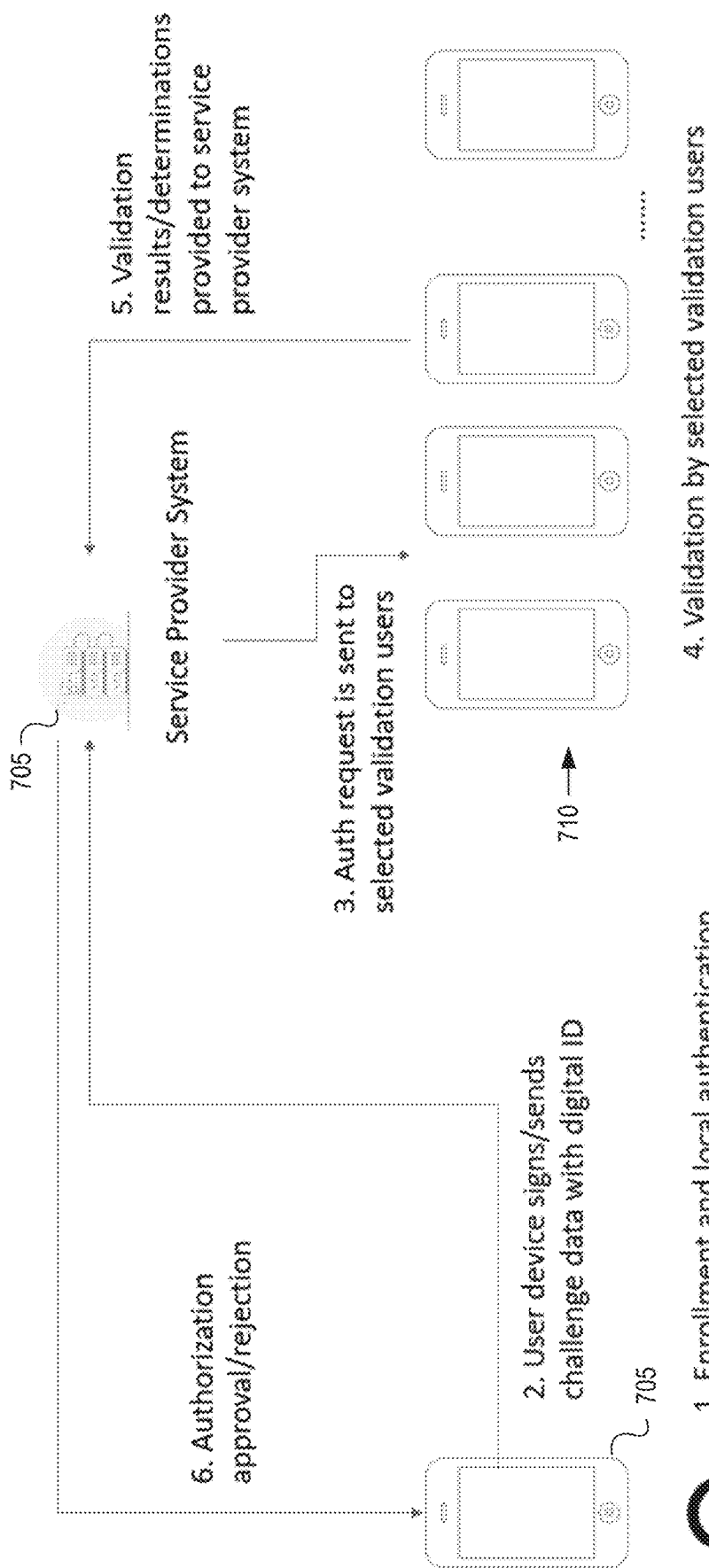
FIG. 7 is an example system diagram illustrating an authentication and validation process according to one or more aspects described herein.

FIG. 7 is a system diagram illustrating an example transaction request validation process. User device 700 may initially enroll for services with a service provider system 705. This enrollment may include the creation of user credentials for the enrolling user. Subsequently, the user may attempt to access the service provider system 705 or request a transaction from the system 705 including performing local authentication (e.g., using biometrics or a password or passcode on the user's device), and receiving a challenge from the service provider system 705. The challenge may represent data or information that must be modified using a user credential to prove the user's identification. For example, the modification may be encryption of the data or information using a user-specific encryption key.

Once received, the service provider system 705 may determine whether a module or server of the service provider system is equipped or able to conduct the validation process. If not, the service provider system 705 may identify and/or select validation users external to the service provider system 705, and transmit a validation request to devices 710 of each of those users. In some arrangements, these validation requests may be encrypted themselves and/or be transmitted through a secure communication channel such as a VPN. The validation request may include the identification of the requesting user, the signed or encrypted challenge provided by the requesting user, and/or a decryption key associated with the requesting user. In some cases, the decryption key might already be stored by the validation user device and therefore might not be provided as part of the validation request. Upon receiving the validation request, each of the validation user devices 710 may perform a validation process using the challenge data. For example, the validation device may attempt to decrypt the encrypted challenge data to determine if it matches with the known decrypted version of the challenge.

The validation user devices 710 may then provide a validation response to service provider system 705 confirming or rejecting the validity of the authentication request. The service provider system 705 may then determine whether to approve the access attempt or other transaction request from the user. If so, the service provider system 705 may transmit a notification to the requesting user device allowing access and/or confirming processing of the requested transaction. In one or more examples, if the transaction is approved, the service provider system 705 may send a silent push notification providing the user device with access to services hosted by the system 705. However, if a transaction is not approved, the notification might not be a silent notification and instead, notify the user of the rejection (e.g., denial of access or rejection of a transaction request). Additionally, the service provider system 705 may provide an explanation of why the request was denied or rejected.

Figure 8:
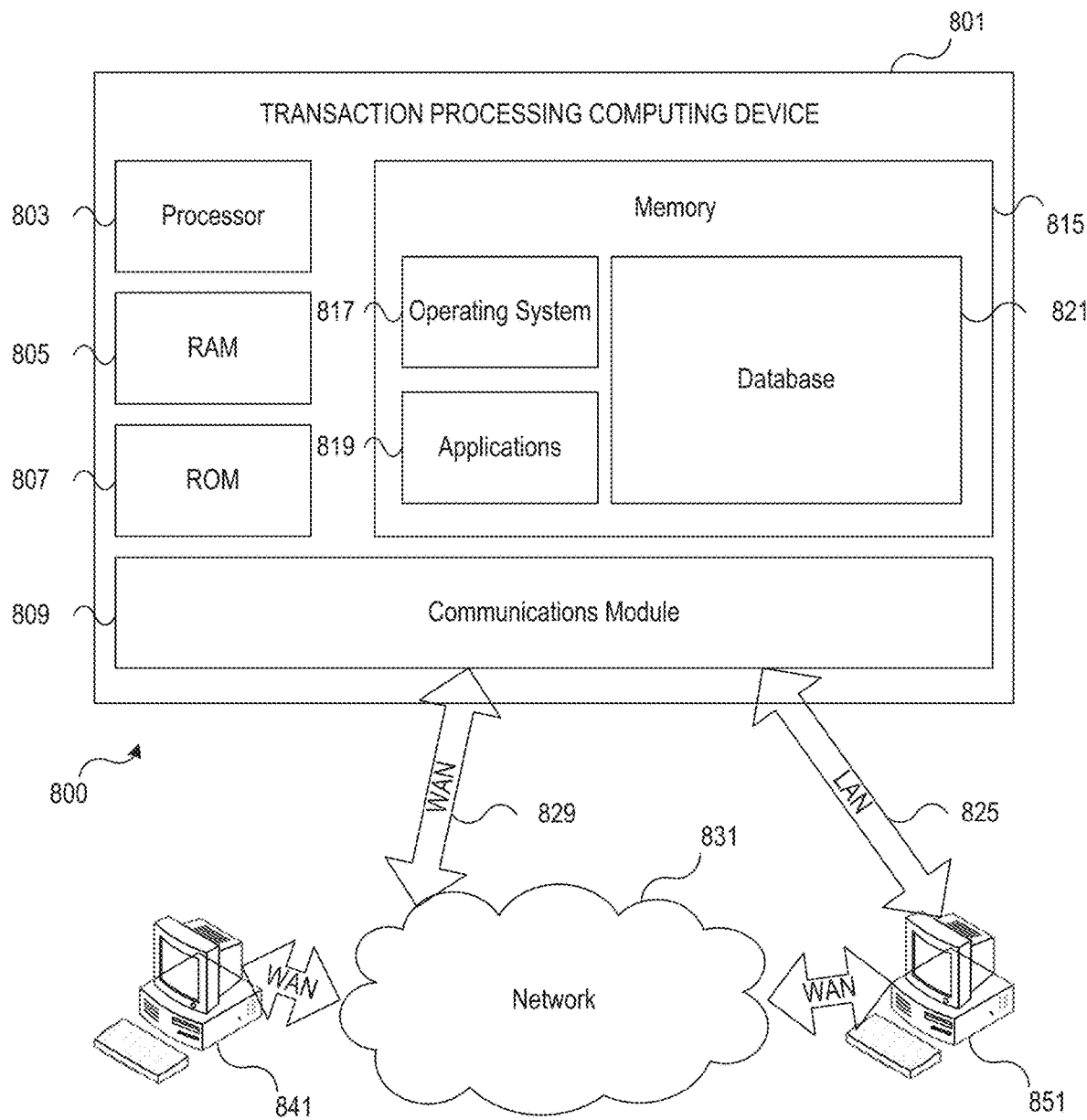
FIG. 8 illustrates an example computing system environment for validating and processing transactions according to one or more aspects described herein.

FIG. 8 depicts an illustrative operating environment in which various aspects of the present disclosure may be implemented in accordance with one or more example embodiments. The arrangements described with respect to FIG. 8 may be applied any devices shown and described herein. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include transaction processing computing device 801 having processor 803 for controlling overall operation of transaction processing computing device 801 and its associated components, including Random Access Memory (RAM) 805, Read-Only Memory (ROM) 807, communications module 809, and memory 815. Transaction processing computing device 801 may include a variety of computer readable media. Computer readable media may be any available media that may be accessed by transaction processing computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by transaction processing computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on transaction processing computing device 801. Such a processor may execute computer-executable instructions stored on a computer-readable medium.

Software may be stored within memory 815 and/or storage to provide instructions to processor 803 for enabling transaction processing computing device 801 to perform various functions as discussed herein. For example, memory 815 may store software used by transaction processing computing device 801, such as operating system 817, application programs 819, and associated database 821. Also, some or all of the computer executable instructions for transaction processing computing device 801 may be embodied in hardware or firmware. Although not shown, RAM 805 may include one or more applications representing the application data stored in RAM 805 while transaction processing computing device 801 is on and corresponding software applications (e.g., software tasks) are running on transaction processing computing device 801.

Communications module 809 may include a microphone, keypad, touch screen, and/or stylus through which a user of transaction processing computing device 801 may provide input, and may also include one or more of a speaker for providing audio output and a video display device for providing textual, audiovisual and/or graphical output. Computing system environment 800 may also include optical scanners (not shown).

Transaction processing computing device 801 may operate in a networked environment supporting connections to one or more remote computing devices, such as computing devices 841 and 851. Computing devices 841 and 851 may be personal computing devices or servers that include any or all of the elements described above relative to transaction processing computing device 801.

The network connections depicted in FIG. 8 may include Local Area Network (LAN) 825 and Wide Area Network (WAN) 829, as well as other networks. When used in a LAN networking environment, transaction processing computing device 801 may be connected to LAN 825 through a network interface or adapter in communications module 809. When used in a WAN networking environment, transaction processing computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method for authenticating users and devices in a network system, the method comprising:
   receiving, by an authentication server from a first user device, a request to register a first user, wherein the request includes first user identification information;
   storing, by the authentication server, the first user identification information in a database with at least one user credential;
   selecting and assigning a first plurality of validation devices to the first user for authenticating transactions requested by the first user, wherein the selection of the first plurality of validation devices is specific to the first user, wherein at least one of the first plurality of validation devices corresponds to at least one other user of the network system different from the first user;
   receiving, by an authentication server from a second user device, a request to register a second user, wherein the request includes second user identification information;
   selecting and assigning a second plurality of validation devices, different from the first plurality of validation devices, to the second user for authenticating transactions requested by the second user, wherein the selection of the second plurality of validation devices is specific to the second user, and wherein at least one of the second plurality of validation devices corresponds to at least one other user of the network system different from the second user;

receiving an authentication request from the first user device, the authentication request including the at least one user credential;
in response to the authentication request:
determining whether an authentication server is available;
in response to determining that the authentication server is not available, transmitting the authentication request to each of the first plurality of assigned validation devices for authenticating the first user;
receiving a response from each of the first plurality of assigned validation devices, each of the responses indicating whether the respective first validation device validated the authentication request; and
determining whether to approve the authentication request based on the responses from the first plurality of assigned validation devices.

2. The method of claim 1, further comprising:
creating a new transaction block to a blockchain network; and
obtaining validation of the new transaction block.

3. The method of claim 1, wherein the at least one user credential is a public cryptographic key.

4. The method of claim 1, wherein transmitting the authentication request to each of the first plurality of assigned validation devices includes issuing a silent push notification to each of the first plurality of assigned validation devices.

5. The method of claim 4, wherein the silent push notification is configured to cause an application on the first plurality of assigned validation devices to be executed to validate the authentication request.

6. The method of claim 1, further comprising:
in response to receiving validation confirmation from less than all of the first plurality of assigned validation devices, rejecting the authentication request.

7. The method of claim 1, further comprising:
in response to receiving validation confirmation from all of the first plurality of assigned validation devices, approving the authentication request.

8. The method of claim 1, wherein selecting and assigning the first plurality of validation devices to the first user includes:
determining a first available time frame of a first validation device and a second available time frame of a second validation device of a set of available validation devices;
determining a geographic location of the first validation device and a geographic location of the second validation device; and
selecting the first validation device and the second validation device from the set of available validation devices based on geographic diversity between the first and second validation devices, and based on the first and second validation devices being available during a same time period.

9. A non-transitory computer-readable medium storing computer-readable instructions that, when executed by a processor, causes an apparatus to:
receive a request to register a first user of a network system, wherein the request includes first user identification information;
store the first user identification information in a database with at least one user credential;
select and assign a first plurality of validation devices to the first user for validating transactions requested by the user, wherein the selection of the first plurality of validation devices is specific to the first user, wherein at least one of the first plurality of validation devices corresponds to at least one other user of the network system different from the first user;
receive a request to register a second user, wherein the request includes second user identification information;
select and assign a second plurality of validation devices, different from the first plurality of validation devices, to the second user for authenticating transactions requested by the second user, wherein the selection of the second plurality of validation devices is specific to the second user, and wherein at least one of the second plurality of validation devices corresponds to at least one other user of the network system different from the second user;
receive an authentication request from a device of the first user, the authentication request including the at least one user credential;
in response to the authentication request:
determine whether an authentication server is available;
in response to determining that the authentication server is not available, transmit the authentication request to each of the first plurality of assigned validation devices for authenticating the first user;
receive a response from each of the first plurality of assigned validation devices, each of the responses indicating whether the respective first validation device validated the authentication request; and
determine whether to approve the authentication request based on the responses from the first plurality of assigned validation devices.

10. The non-transitory computer-readable medium of claim 9, wherein transmitting the authentication request to each of the first plurality of assigned validation devices includes issuing a silent push notification to each of the first plurality of assigned validation devices.

11. The non-transitory computer-readable medium of claim 10, wherein the silent push notification is configured to cause an application on the assigned first validation devices to be executed to validate the authentication request.

12. The non-transitory computer-readable medium of claim 9, wherein the computer-readable instructions, when executed, further cause the apparatus to:
in response to receiving validation confirmation from less than all of the first plurality of assigned validation devices, rejecting the authentication request.

13. The non-transitory computer-readable medium of claim 9, wherein the computer-readable instructions, when executed, further cause the apparatus to:
in response to receiving validation confirmation from all of the first plurality of assigned validation devices, approving the authentication request.

14. The non-transitory computer-readable medium of claim 9, wherein selecting and assigning the first plurality of validation devices to the first user includes:
selecting a first validation device and a second validation device from a set of available validation devices based on geographic diversity between the first and second validation devices, and based on the first and second validation devices being available during a same time period.

15. An apparatus comprising:
a processor; and
memory storing computer-readable instructions that, when executed, cause the apparatus to:

receive a request to register a first user of a network system, wherein the request includes first user identification information;

store the first user identification information in a database with at least one user credential;

select and assign a first plurality of validation devices to the first user for validating transactions requested by the first user, wherein the selection of the first plurality of validation devices is specific to the first user, wherein at least one of the first plurality of validation devices corresponds to at least one other user of the network system different from the first user;

receive a request to register a second user, wherein the request includes second user identification information;

select and assign a second plurality of validation devices, different from the first plurality of validation devices, to the second user for authenticating transactions requested by the second user, wherein the selection of the second plurality of validation devices is specific to the second user, and wherein at least one of the second plurality of validation devices corresponds to at least one other user of the network system different from the second user;

receive an authentication request from a device of the first user, the authentication request including the at least one user credential;

in response to the authentication request:
  determine whether an authentication server is available;
  in response to determining that the authentication server is not available, transmit the authentication request to each of the first plurality of assigned validation devices for authenticating the first user;
  receive a response from each of the first plurality of assigned validation devices, each of the responses indicating whether the respective first validation device validated the authentication request; and
  determine whether to approve the authentication request based on the responses from the first plurality of assigned validation devices.

16. The apparatus of claim 15, wherein transmitting the authentication request to each of the first plurality of assigned validation devices includes issuing a silent push notification to each of the first plurality of assigned validation devices.

17. The apparatus of claim 16, wherein the silent push notification is configured to cause an application on the first plurality of assigned validation devices to be executed to validate the authentication request.

18. The apparatus of claim 15, wherein the computer-readable instructions, when executed, further cause the apparatus to:
  in response to receiving validation confirmation from less than all of the first plurality of assigned validation devices, rejecting the authentication request.

19. The apparatus of claim 15, wherein the computer-readable instructions, when executed, further cause the apparatus to:
  in response to receiving validation confirmation from all of the first plurality of assigned validation devices, approving the authentication request.

20. The apparatus of claim 15, wherein selecting and assigning the first plurality of validation devices to the first user includes:
  selecting a first validation device and a second validation device from a set of available validation devices based on geographic diversity between the first and second validation devices, and based on the first and second validation devices being available during a same time period.

* * * * *